(12) United States Patent
Fushida et al.

(10) Patent No.: US 12,460,062 B2
(45) Date of Patent: Nov. 4, 2025

(54) METHOD OF REMOVING INK LAYER FROM SHRINK SLEEVE LABEL

(71) Applicant: Fuji Seal International, Inc., Osaka (JP)

(72) Inventors: Masaya Fushida, Osaka (JP); Akira Miyazaki, Osaka (JP)

(73) Assignee: Fuji Seal International, Inc., Osaka (JP)

( * ) Notice: Subject to any disclaimer, the term of this patent is extended or adjusted under 35 U.S.C. 154(b) by 686 days.

(21) Appl. No.: 17/796,470

(22) PCT Filed: Jan. 25, 2021

(86) PCT No.: PCT/JP2021/002384
§ 371 (c)(1),
(2) Date: Jul. 29, 2022

(87) PCT Pub. No.: WO2021/157399
PCT Pub. Date: Aug. 12, 2021

(65) Prior Publication Data
US 2023/0048686 A1 Feb. 16, 2023

(30) Foreign Application Priority Data

Feb. 6, 2020 (JP) ................................. 2020-018775

(51) Int. Cl.
*C08J 11/14* (2006.01)
*B29B 17/02* (2006.01)
(52) U.S. Cl.
CPC ............... *C08J 11/14* (2013.01); *B29B 17/02* (2013.01); *B29B 2017/0289* (2013.01)

(58) Field of Classification Search
USPC .............................. 521/45; 528/190, 193, 194
See application file for complete search history.

(56) References Cited

U.S. PATENT DOCUMENTS

2009/0042024 A1* 2/2009 Fujii ..................... G09F 3/04
428/480

FOREIGN PATENT DOCUMENTS

| EP | 2832459 A1 * | 2/2015 | ............. B02C 23/20 |
|----|----|----|----|
| JP | 2001-350411 A | 12/2001 | |
| JP | 2002-60518 A | 2/2002 | |
| JP | 2002-249571 A | 9/2002 | |
| JP | 2003122256 A * | 4/2003 | ............. B29B 17/02 |
| JP | 2005-298354 A | 10/2005 | |
| JP | 2008-100413 A | 5/2008 | |

OTHER PUBLICATIONS

JP-2003122256-A Machine Translation (Year: 2003).*

* cited by examiner

*Primary Examiner* — Terressa Boykin
(74) *Attorney, Agent, or Firm* — Troutman Pepper Locke LLP

(57) ABSTRACT

Provided is a method of efficiently removing an ink layer. The method of removing an ink layer from a shrink sleeve label includes preheating the shrink sleeve label including the ink layer, shredding the shrink sleeve label after the preheating to fabricate shrink sleeve label pieces, and removing the ink layer from the shrink sleeve label pieces by alkaline desorption. A temperature of the preheating is the same as a temperature of the alkaline desorption or higher than the temperature of the alkaline desorption.

4 Claims, 1 Drawing Sheet

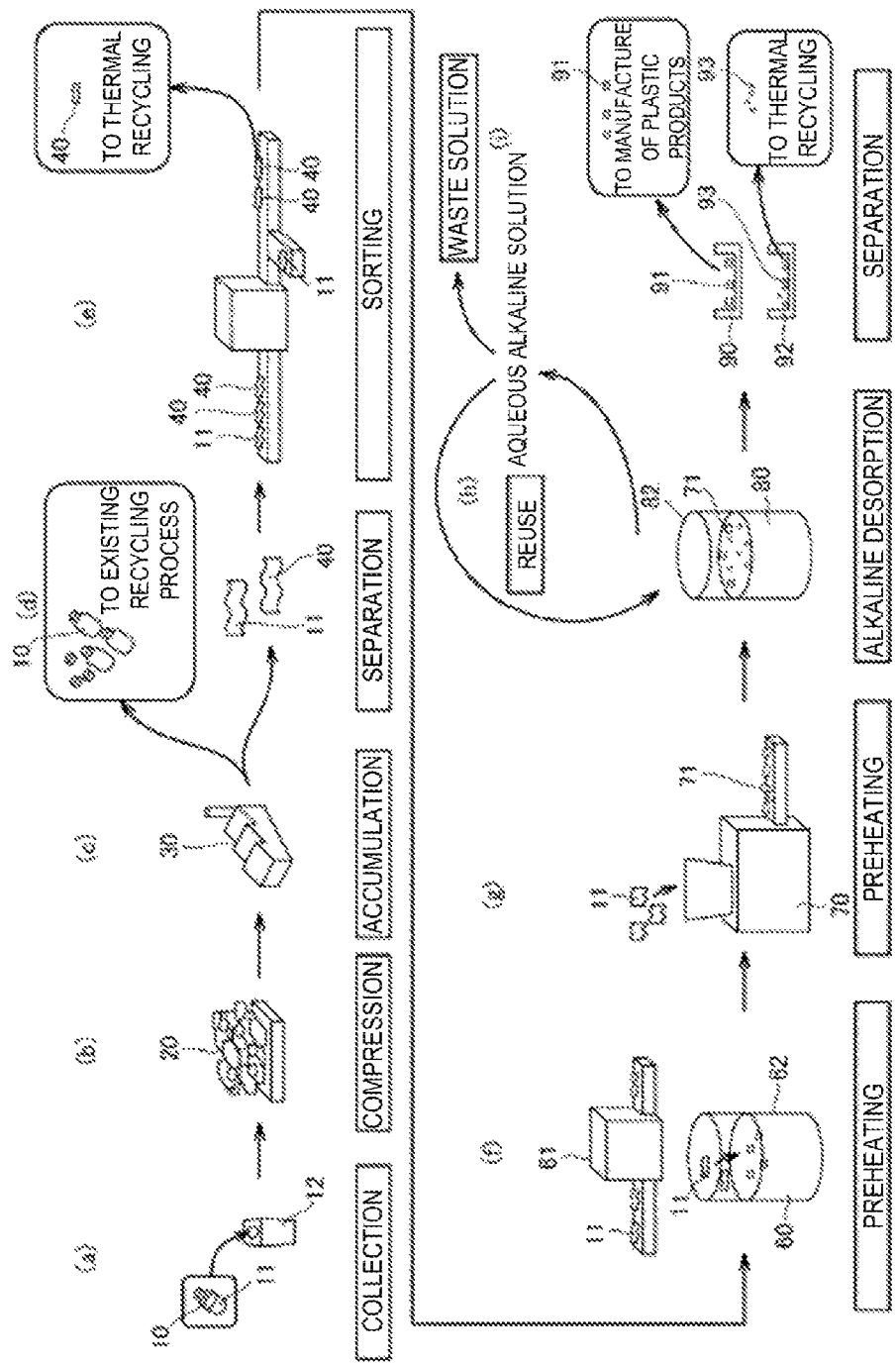

METHOD OF REMOVING INK LAYER FROM SHRINK SLEEVE LABEL

TECHNICAL FIELD

The present disclosure relates to a method of removing an ink layer from a shrink sleeve label.

BACKGROUND ART

In recent years, plastic products such as polyethylene terephthalate bottles (PET bottles) have been widely used. From a resource-saving perspective, environmental perspective, and the like, recycling plastic products such as PET bottles are strongly urged.

Among plastic products, recycling infrastructure for PET bottles is already established. However, a plastic shrink sleeve label including an ink layer formed by printing for displaying product information or the like may be applied to a body portion of the PET bottle, but this shrink sleeve label cannot yet be recycled.

One factor that inhibits recycling of the shrink sleeve label is that the ink layer cannot be efficiently removed from the shrink sleeve label. If the ink layer cannot be efficiently removed from the shrink sleeve label, useful pellets cannot be fabricated from the shrink sleeve label.

For example, Patent Document 1 describes a method of heat-shrinking a heat-shrinkable label under non-aqueous immersion conditions and subsequently bringing the heat-shrinkable label into contact with low-temperature alkaline water to remove the ink layer by desorption.

CITATION LIST

Patent Literature

Patent Document 1: JP 2001-350411 A

SUMMARY OF INVENTION

Technical Problem

While it is possible to remove the ink layer by desorption using the method described in Patent Document 1, a more efficient method of removing the ink layer has been in demand due to increasing environmental concerns in recent years.

Solution to Problem

According to an embodiment disclosed herein, a method of removing an ink layer from a shrink sleeve label includes preheating the shrink sleeve label including the ink layer, shredding the shrink sleeve label after the preheating to fabricate shrink sleeve label pieces, and removing the ink layer from the shrink sleeve label pieces by alkaline desorption. A temperature of the preheating is the same as a temperature of the alkaline desorption or higher than the temperature of the alkaline desorption.

Advantageous Effects of Invention

According to the embodiment disclosed herein, a method of removing an ink layer more efficiently than in the related art can be provided.

BRIEF DESCRIPTION OF DRAWINGS

FIGS. 1(a) to 1(i) are diagrams illustrating an example of the flow of a method of removing an ink layer from a shrink sleeve label according to an embodiment.

DESCRIPTION OF EMBODIMENTS

FIGS. 1(a) to 1(i) are diagrams illustrating an example of the flow of a method of removing an ink layer from a shrink sleeve label according to an embodiment. The method of removing an ink layer from a shrink sleeve label according to the embodiment will be described below with reference to FIGS. 1(a) to 1(i).

Collection Process

First, as illustrated in FIG. 1(a), PET bottles 10 are collected in a collection box 12. In this example, a shrink sleeve label 11 including an ink layer is applied to the body portion of each PET bottle 10. The ink layer is a printed layer used for product display or the like.

As the shrink sleeve label 11, for example, a shrink sleeve label including an alkaline water desorptive ink layer on at least one surface of a heat-shrinkable shrink film (base material) can be used. Examples of the shrink film include a polyester film made of polyethylene terephthalate, polyethylene naphthalate, or the like; a styrene film made of a styrene-butadiene block copolymer or the like; an olefin film made of an olefin resin such as polyethylene or polypropylene; and a polyvinyl chloride film made of polyvinyl chloride resin. These may be foamed films. Further, the shrink film may be a single layer, or may be a layered body of two or more layers. The color of the shrink film is not particularly limited, and may be, for example, milky white or transparent.

A heat shrinkage rate of the shrink film in at least a direction X (main shrinkage direction) is preferably 30% or greater, more preferably 50% or greater, to ensure shrinkage adhesion to various containers and the like. The thickness of the shrink film can be selected as appropriate in consideration of handling of the shrink sleeve label 11 and the like, and can be, for example, from about 10 to about 100 μm, preferably from about 15 to about 60 μm. Note that the numerical values of the shrink film are numerical values of the shrink film used in the fabrication of the shrink sleeve label 11 before being applied to a container such as the PET bottle 10.

The surface of the shrink film may be subject to surface treatment such as corona discharge treatment, or may be provided with an anchor coat layer, as necessary, to enhance adhesion with the ink layer. The anchor coat layer can be formed by using a known anchor coating agent or the like.

The ink layer can be composed of, for example, either oil-based ink or water-based ink, provided that the ink layer can be dissolved in or swell in an aqueous alkaline solution and thus release from the base material.

As a method of forming the ink layer on the surface of the shrink film, a method of forming the ink layer on the surface of the shrink film by gravure printing, flexographic printing, screen printing, or inkjet printing, for example, can be used. The ink layer may be a single layer or may be multilayered. The thickness of the ink layer can be selected as appropriate depending on the application and the like, and can be, for example, from about 0.1 to about 100 μm. Further, in a case in which the ink layer is multilayered, the entire ink layer may be alkaline soluble, and at least the ink layer positioned closest to the shrink film in the layered structure need only be alkaline soluble.

Compression Process

Next, as illustrated in FIG. 1(b), the collected PET bottles 10 are compressed with the shrink sleeve labels 11 still applied, thereby forming a bale 20 with shrink sleeve labels.

Accumulation Process

Next, as illustrated in FIG. 1(c), the bale 20 with shrink sleeve labels is sent to and accumulated in a recycling plant 30.

Separation Process

Next, as illustrated in FIG. 1(d), in the recycling plant 30, the shrink sleeve labels 11 are removed from the PET bottles 10 in the bale 20 with shrink sleeve labels, separating the bale 20 with shrink sleeve labels into the PET bottles 10 and the shrink sleeve labels 11. Items removed from the PET bottles 10 include regular labels 40 in addition to the shrink sleeve labels 11. The PET bottles 10 separated from the shrink sleeve labels 11 and/or regular labels 11 are reused in an existing PET bottle recycling process. Examples of the regular labels 40 include a shrink sleeve label including a non-alkaline water desorptive ink layer or a non-shrink sleeve label.

Sorting Process

Next, as illustrated in FIG. 1(e), the shrink sleeve labels 11 and the regular labels 40 are sorted, thereby separating the shrink sleeve labels 11 from the regular labels 40 and recovering the shrink sleeve labels 11. The regular labels 40 separated from the shrink sleeve labels 11 and recovered are reused in a thermal recycling process, for example.

Preheating Step

Next, as illustrated in FIG. 1(f), the shrink sleeve labels 11 including the ink layer are preheated. The method of preheating the shrink sleeve labels 11 is not particularly limited as long as the method is one in which shrink sleeve label pieces are shrunk by alkaline desorption (described below) to suppress the amount of curling, and the method is performed with a temperature of the preheating being the same as a temperature of the alkaline desorption or higher than the temperature of the alkaline desorption. From the perspective of efficiently removing the ink layers from the shrink sleeve label pieces by alkaline desorption as to be described below, the temperature of the preheating is preferably at least 5° C. higher than the temperature of the alkaline desorption.

Examples of the method of preheating the shrink sleeve labels 11 include a method of passing the shrink sleeve labels 11 through a hot air tunnel 61, and a method of immersing the shrink sleeve labels 11 in hot water 60 in a hot water tank 62.

However, due to reasons 1) to 4) below, it is more preferable to use the method of immersing the shrink sleeve labels 11 in the hot water 60 in the hot water tank 62 than the method of passing the shrink sleeve labels 11 through the hot air tunnel 61 as the method of preheating the shrink sleeve labels 11.

1) When hot air is used, the shrink sleeve labels 11 removed from the PET bottles 10 are blown away by the hot air and are difficult to control.
2) The temperature is easier to control in the method of immersion in hot water than in the method that uses hot air.
3) The method of immersion in hot water has a smaller device footprint than the method that uses hot air.
4) The method of immersion in hot water is less likely to result in uneven shrinkage of the shrink sleeve label 11 than the method that uses hot air, making uniform shrinkage possible.

When the shrink sleeve label 11 is preheated by immersing the shrink sleeve label 11 in the hot water 60 in the hot water tank 62, the shrink sleeve label 11 can be immersed in hot water at a temperature from about 80° C. to about 90° C. for about 10 seconds to 20 seconds, for example.

The temperature of the preheating refers to a surface temperature of the shrink sleeve label 11 during preheating. Accordingly, when the shrink sleeve label 11 is preheated by immersing the shrink sleeve label 11 in the hot water 60 in the hot water tank 62, the temperature of the preheating can be replaced with a temperature of the hot water. Further, when the shrink sleeve label 11 is preheated by passing the shrink sleeve label 11 through the hot air tunnel 61, the temperature of the preheating can be replaced with a temperature of the hot air.

Shredding Process

Next, as illustrated in FIG. 1(g), the shrink sleeve label 11 after preheating is shredded by a shredder 70 to fabricate shrink sleeve label pieces 71. A method of shredding the shrink sleeve label 11 after preheating is not particularly limited as long as the method is one in which the size of the shrink sleeve label piece 71 produced by the shredding is smaller than the size of the shrink sleeve label 11 after preheating. For example, the shrink sleeve label 11 after preheating can be shredded to a size (several centimeters square, for example) large enough to efficiently remove the ink layer from the shrink sleeve label piece 71 by the alkaline desorption to be described below.

Alkaline Desorption Process

Next, as illustrated in FIG. 1(h), the ink layer is removed from the shrink sleeve label piece 71 by alkaline desorption. Alkaline desorption can be performed by, for example, either treatment (1) or (2) below.

(1) One-Tank Treatment

This treatment can be performed by agitating an aqueous alkaline solution 80 in a thermal alkaline tank 82 while immersing the shrink sleeve label piece 71 therein. The time required for treatment varies depending on agitation speed, the quantity of the shrink sleeve label pieces 71 dropped into the aqueous alkaline solution 80, and other factors, but is from about 30 seconds to about 20 minutes. According to this treatment, it is possible to efficiently separate shrink film pieces 91 and ink coating films 93 in the aqueous alkaline solution 80.

As described above, in the present embodiment, the temperature of the preheating is set to be the same as the temperature of the alkaline desorption or to be higher than the temperature of the alkaline desorption. The temperature of the alkaline desorption refers to the surface temperature of the shrink sleeve label piece 71 during alkaline desorption. Accordingly, the temperature of the alkaline desorption can be replaced with a temperature of the aqueous alkaline solution 80 in which the shrink sleeve label piece 71 is immersed. From the perspective of efficiently removing the ink layer from the shrink sleeve label piece 71 by the alkaline desorption, the temperature of the alkaline desorption (temperature of the aqueous alkaline solution 80) is preferably 65° C. or higher. Note that the upper limit of the temperature of the alkaline desorption is theoretically 100° C., more preferably the temperature of the alkaline desorption is from 85° C. to 95° C., and even more preferably the temperature of the alkaline desorption is from 80° C. to 90° C.

The aqueous alkaline solution 80 after removal of the ink layer from the shrink sleeve label piece 71 may be discarded as waste solution, or may be reused as the aqueous alkaline solution 80 for alkaline desorption.

The aqueous alkaline solution 80 is not particularly limited as long as the solution can remove the ink layer from the shrink sleeve label piece 71 by immersion of the shrink sleeve label piece 71, and is not particularly limited as long as the solution is an aqueous solution having alkalinity and containing an alkaline substance. For example, an aqueous solution of an alkaline metal hydroxide such as sodium hydroxide (NaOH) or potassium hydroxide (KOH), an aqueous solution of an alkaline metal carbonate such as sodium carbonate ($Na_2CO_3$), an aqueous solution of an alkaline metal hydrogen carbonate such as sodium hydrogen carbonate ($NaHCO_3$), or ammonia water can be used.

The concentration of the alkaline substance in the aqueous alkaline solution 80 can be selected as appropriate in a range that does not impair the desorption performance for the ink layer, operability, workability, and the like, and is, for example, from about 0.1 to about 10 wt. %, preferably from about 0.5 to about 5 wt. %, and more preferably from about 1 to about 3 wt. %.

(2) Two-Tank Treatment

This treatment can be performed by immersing the shrink sleeve label piece 71 in the aqueous alkaline solution 80 in the thermal alkaline tank 82 for from about 30 seconds to about 20 minutes, subsequently removing the shrink sleeve label piece 71 from the thermal alkaline tank 82, and then immersing the removed shrink sleeve label piece 71 in water in a water tank (not illustrated) while agitating the water. The preferable temperature (temperature of alkaline desorption) and type of the aqueous alkaline solution 80 are the same as those of the aqueous alkaline solution 80 used in the (1) One-Tank Treatment described above. The temperature of the water in the water tank is not particularly limited, but is preferably a temperature lower than the temperature of the alkaline desorption from the perspective of avoiding unintended shrinkage of the shrink sleeve label piece 71, and is preferably a temperature of about room temperature (around 27° C.) from the perspective of energy consumption.

According to this treatment, the shrink sleeve label piece 71 is gently immersed in the aqueous alkaline solution 80. This makes it possible to reduce adhesion between the shrink sleeve label piece 71 and the ink layer while suppressing complete separation of the ink layer from the shrink sleeve label piece 71 in the aqueous alkaline solution 80. Note that "gently immersed" means that the aqueous alkaline solution 80 is not agitated or very lightly agitated so that the complete separation described above does not occur. Then, the shrink film piece 91 and the ink coating film 93 can be subsequently separated in water by immersion and agitation in the water.

The aqueous alkaline solution 80 after immersion of the shrink sleeve label piece 71 may be discarded as waste solution, or may be reused as the aqueous alkaline solution 80 for alkaline desorption. In the case of the two-tank treatment, there is minimal change in the characteristics of the aqueous alkaline solution 80 compared to that of the one-tank treatment, and thus the aqueous alkaline solution 80 can be reused more efficiently. Note that changes in the characteristics of the aqueous alkaline solution 80 are caused by contamination of a large amount of the ink layer, for example.

Separation Process

Next, as illustrated in FIG. 1(i), the shrink film piece 91 and the ink coating film 93 are separated. Specifically, for example, the shrink film pieces 91 after removal of the ink layer from the shrink sleeve label pieces 71 are collected by a first mesh 90 having relatively large openings, and the ink coating films 93 smaller than the shrink film pieces 91 are collected by a second mesh 92 having relatively small openings. The ink coating film 93 is a film obtained by finely separating the ink layer removed from the shrink sleeve label pieces 71 during alkaline desorption.

Subsequently, the shrink film pieces 91 collected by the first mesh 90 can be reused as plastic raw material for manufacturing a plastic product such as pellets, for example. Further, the shrink film pieces 91 can also be reused as shrink sleeve labels by mixing the shrink film pieces 91 into a raw material for new shrink sleeve labels. On the other hand, the ink coating film 93 collected by the second mesh 92 can be reused in a thermal recycling process, for example.

The method of removing the ink layer from the shrink sleeve label according to the embodiment includes preheating the shrink sleeve label including the ink layer, shredding the shrink sleeve label after the preheating to fabricate the shrink sleeve label pieces, and removing the ink layer from the shrink sleeve label pieces by alkaline desorption, and the temperature of the preheating is the same as the temperature of the alkaline desorption or higher than the temperature of the alkaline desorption.

Since at least these components are included in the method of removing the ink layer from the shrink sleeve label according to the embodiment, the ink layer can be removed from the shrink sleeve label more efficiently than in the related art.

That is, in the present embodiment, the shrink sleeve label is shredded and formed into shrink sleeve label pieces prior to removal of the ink layer from the shrink sleeve label by alkaline desorption. This is because the ink layer can be efficiently removed from the shrink sleeve label by alkaline desorption with the shrink sleeve label shredded into smaller shrink sleeve label pieces.

Nevertheless, in a case in which the shrink sleeve label is shredded without preheating and the fabricated shrink sleeve label pieces are immersed in the aqueous alkaline solution, the shrink sleeve label pieces shrink while rolling up and curling in the aqueous alkaline solution. Removing an ink layer from a small, curled shrink sleeve label piece is exceedingly difficult.

The shrink sleeve label applied to a PET bottle or the like is heat-shrunk once when applied, but shrinking capacity still remains in the shrink sleeve label. Therefore, in a case in which the temperature of the aqueous alkaline solution during alkaline desorption is high, the shrink sleeve label piece is further heat-shrunk. On the other hand, in a case in which the temperature of the aqueous alkaline solution is low, the ink layer cannot be efficiently removed from the shrink sleeve label piece.

Therefore, in the present embodiment, before the shrink sleeve label is shredded into shrink sleeve label pieces, the shrink sleeve label is preheated at a temperature equal to or higher than the temperature of the alkaline desorption, thereby heat-shrinking the shrink sleeve label in advance. This makes it possible to make the shape of the shrink sleeve label wavy having a small degree of curl, for example.

Then, the shrink sleeve label heat-shrunk in advance by preheating is shredded to form the shrink sleeve label pieces. The shrink sleeve label pieces obtained by shredding the shrink sleeve label having a small degree of curl also have a small degree of curl. Note that, in a case in which the shrink sleeve label is preheated after the shrink sleeve label is shredded, the shrink sleeve label pieces fully curl (roll up), which is not suitable for ink layer removal.

Subsequently, such shrink sleeve label pieces are subject to alkaline desorption at a temperature that is equal to or lower than that of the preheating. As a result, even in a case in which the temperature of the aqueous alkaline solution during the alkaline desorption is high, the ink layer can be removed in a state in which shrinkage of the shrink sleeve label pieces is suppressed during the alkaline desorption.

For the reasons described above, in the present embodiment, the ink layer can conceivably be even more efficiently removed than in the related art.

In particular, in general, many of the shrink sleeve labels 11 removed from containers such as the PET bottle 10 have a side of 10 cm or greater, and the efficiency of removing the ink layer can be greatly improved by heat-shrinking by preheating and subsequently shredding the shrink sleeve labels 11 of such a size to a few centimeters square, preferably 5 centimeters square or less, and performing alkaline desorption at 65° C. or higher, preferably 80° C. or higher, more preferably 85° C. or higher.

Examples of the shrink sleeve label 11 suitable for the method of the present embodiment include a shrink sleeve label that, after being removed from a container such as the PET bottle 10 and immersed in a hot bath at 95° C. for 10 seconds, has a shrinkage rate of 30% or greater, preferably 40% or greater, and more preferably 50% or greater as measured in a radial direction of the container (main shrinkage direction).

Further, although intense agitation of an aqueous solution having alkalinity is dangerous, because the degree of curl is small in the present embodiment, the aqueous alkaline solution can come into contact with the entire surface of the label piece 71 without intense agitation, and thus the ink layer can be removed from the shrink sleeve label 11.

EXAMPLES

Experiment 1

First, a shrink film having a cylindrical shape of 50 μm (thickness)×15 cm (height; width)×24 cm (circumference) was prepared by using an original sheet of a PET shrink film (HISHIPET (trade name) LX-18S available from Mitsubishi Chemical Corporation) having a thickness of 50 μm. A shrink sleeve label obtained by layering a first ink layer, a second ink layer, and a third ink layer in this order on a surface of the shrink film having the cylindrical shape was then formed. The first ink layer was an alkaline-soluble ink layer, the second ink layer and the third ink layer were non-alkaline-soluble ink layers, and the thickness of each ink layer was approximately 2 μm.

Specifically, the first ink layer was a resin layer formed by drying ink obtained by blending 56 wt. % of ethyl acetate, 8 wt. % of isopropyl alcohol, 15 wt. % of n-propyl acetate, 3 wt. % of nitrocellulose, 15 wt. % of acrylic resin, and 3 wt. % of vinyl chloride-vinyl acetate copolymer. The second ink layer was a resin layer formed by drying the product "Chorus 114 Red KT2" (available from DIC Graphics Corporation). The third ink layer was a resin layer formed by drying the product "NT High Lamik (NF) 701 White" (available from Dainichiseika Color & Chemicals Mfg. Co., Ltd.).

Next, with the shrink sleeve label applied to a PET bottle having a cylindrical shape and an outer diameter of 54 mm, the shrink sleeve label was shrunk, thereby fabricating a PET bottle with a shrink sleeve label. The shrinkage rate of the shrink sleeve label at this time was about 30%, and the area of the shrink sleeve label after application was about 70% of the area of the shrink sleeve label before application. The shrink sleeve label was then peeled from the PET bottle.

Next, the shrink sleeve label peeled from the PET bottle was immersed in hot water at 70° C. for 20 seconds while lightly agitating the hot water to perform preheating. As a result, the area (length×width) of the shrink sleeve label was about 50% of the area of the shrink sleeve label before preheating (area of the shrink sleeve label after application).

Next, the shrink sleeve label after preheating was shredded to fabricate shrink sleeve label pieces each having a substantially square shape of 40 mm (length)×40 mm (width).

Subsequently, the shrink sleeve label pieces were immersed in a 1.5 wt. % NaOH aqueous solution at 70° C. for 60 seconds while agitating the NaOH aqueous solution, thereby performing alkaline desorption of the ink layer from the shrink film.

The process described above was performed on ten shrink sleeve label pieces, and the number of the shrink sleeve label pieces from which the ink layer was removed from the shrink film was confirmed. The results are shown in Table 1.

As shown in Table 1, in Experiment 1, the number of shrink sleeve label pieces with the ink layer remaining on the surface of the shrink film after alkaline desorption was 0 out of 10.

Experiment 2

In Experiment 2, the ink layer was removed from the shrink film of the shrink sleeve label pieces by the same method and under the same conditions as those in Experiment 1, except that the temperatures of the hot water and the NaOH aqueous solution were each set to 80° C. The number of shrink sleeve label pieces from which the ink layer was removed was then confirmed. The results are shown in Table 1.

As shown in Table 1, in Experiment 2, the number of shrink sleeve label pieces with the ink layer remaining on the surface of the shrink film after alkaline desorption was 0 out of 10.

Experiment 3

In Experiment 3, the ink layer was removed from the shrink film of the shrink sleeve label pieces by the same method and under the same conditions as those in Experiment 1, except that the temperatures of the hot water and the NaOH aqueous solution were each set to 90° C. The number of shrink sleeve label pieces from which the ink layer was removed was then confirmed. The results are shown in Table 1.

As shown in Table 1, in Experiment 3, the number of shrink sleeve label pieces with the ink layer remaining on the surface of the shrink film after alkaline desorption was 1 out of 10.

Experiment 4

In Experiment 4, the ink layer was removed from the shrink film of the shrink sleeve label pieces by the same method and under the same conditions as those in Experiment 1, except that the temperatures of the hot water and the NaOH aqueous solution were each set to 95° C. The number of shrink sleeve label pieces from which the ink layer was removed was then confirmed. The results are shown in Table 1.

As shown in Table 1, in Experiment 4, the number of shrink sleeve label pieces with the ink layer remaining on the surface of the shrink film after alkaline desorption was 1 out of 10.

Experiment 5

In Experiment 5, the ink layer was removed from the shrink film of the shrink sleeve label pieces by the same method and under the same conditions as those in Experiment 1, except that the temperature of the hot water was set to 80° C. The number of shrink sleeve label pieces from which the ink layer was removed was then confirmed. The results are shown in Table 2.

As shown in Table 2, in Experiment 5, the number of shrink sleeve label pieces with the ink layer remaining on the surface of the shrink film after alkaline desorption was 0 out of 10.

Experiment 6

In Experiment 6, the ink layer was removed from the shrink film of the shrink sleeve label pieces by the same method and under the same conditions as those in Experiment 1, except that the temperature of the hot water was set to 90° C. The number of shrink sleeve label pieces from which the ink layer was removed was then confirmed. The results are shown in Table 2.

As shown in Table 2, in Experiment 6, the number of shrink sleeve label pieces with the ink layer remaining on the surface of the shrink film after alkaline desorption was 0 out of 10.

Experiment 7

In Experiment 7, the ink layer was removed from the shrink film of the shrink sleeve label pieces by the same method and under the same conditions as those in Experiment 1, except that the temperature of the hot water was set to 90° C. and the temperature of the NaOH aqueous solution was set to 85° C. The number of shrink sleeve label pieces from which the ink layer was removed was then confirmed. The results are shown in Table 2.

As shown in Table 2, in Experiment 7, the number of shrink sleeve label pieces with the ink layer remaining on the surface of the shrink film after alkaline desorption was 0 out of 10.

Experiment 8

In Experiment 8, the ink layer was removed from the shrink film of the shrink sleeve label pieces by the same method and under the same conditions as those in Experiment 1, except that the temperature of the hot water was set to 90° C. and the temperature of the NaOH aqueous solution was set to 80° C. The number of shrink sleeve label pieces from which the ink layer was removed was then confirmed. The results are shown in Table 2.

As shown in Table 2, in Experiment 8, the number of shrink sleeve label pieces with the ink layer remaining on the surface of the shrink film after alkaline desorption was 0 out of 10.

Experiment 9

In Experiment 9, the ink layer was removed from the shrink film of the shrink sleeve label pieces by the same method and under the same conditions as those in Experiment 5, except that the shrink sleeve label pieces were immersed in the NaOH aqueous solution at 80° C. for 10 minutes without agitation and subsequently removed from the NaOH aqueous solution and immersed in water at 27° C. (room temperature) for 5 minutes with agitation. The number of shrink sleeve label pieces from which the ink layer was removed was then confirmed. The results are shown in Table 2.

As shown in Table 2, in Experiment 9, the number of shrink sleeve label pieces with the ink layer remaining on the surface of the shrink film after alkaline desorption was 0 out of 10.

Experiment 10

In Experiment 10, the ink layer was removed from the shrink film of the shrink sleeve label pieces by the same method and under the same conditions as those in Experiment 1, except that the temperature of the hot water was set to 80° C. and the temperature of the NaOH aqueous solution was set to 90° C. The number of shrink sleeve label pieces from which the ink layer was removed was then confirmed. The results are shown in Table 3.

As shown in Table 3, in Experiment 10, the number of shrink sleeve label pieces with the ink layer remaining on the surface of the shrink film after alkaline desorption was 8 out of 10.

Experiment 11

In Experiment 11, the ink layer was removed from the shrink film of the shrink sleeve label pieces by the same method and under the same conditions as those in Experiment 1, except that the temperature of the hot water was set to 80° C. and the temperature of the NaOH aqueous solution was set to 95° C. The number of shrink sleeve label pieces from which the ink layer was removed was then confirmed. The results are shown in Table 3.

As shown in Table 3, in Experiment 11, the number of shrink sleeve label pieces with the ink layer remaining on the surface of the shrink film after alkaline desorption was 5 out of 10.

Experiment 12

In Experiment 12, the ink layer was removed from the shrink film of the shrink sleeve label pieces by the same method and under the same conditions as those in Experiment 1, except that the temperature of the hot water was set to 90° C. and the temperature of the NaOH aqueous solution was set to 95° C. The number of shrink sleeve label pieces from which the ink layer was removed was then confirmed. The results are shown in Table 3.

As shown in Table 3, in Experiment 12, the number of shrink sleeve label pieces with the ink layer remaining on the surface of the shrink film after alkaline desorption was 4 out of 10.

TABLE 1

|  | Experiment 1 | Experiment 2 | Experiment 3 | Experiment 4 |
|---|---|---|---|---|
| Temperature of preheating (hot water temperature) | 70° C. | 80° C. | 90° C. | 95° C. |
| Temperature of alkaline desorption (NaOH aqueous solution temperature) | 70° C. | 80° C. | 90° C. | 95° C. |
| Number of shrink sleeve label pieces with ink layer remaining (n = 10) | 0 | 0 | 1 | 1 |

TABLE 2

|  | Experiment 5 | Experiment 6 | Experiment 7 | Experiment 8 | Experiment 9 |
|---|---|---|---|---|---|
| Temperature of preheating (hot water temperature) | 80° C. | 90° C. | 90° C. | 90° C. | 80° C. |
| Temperature of alkaline desorption (NaOH aqueous solution temperature) | 70° C. | 70° C. | 85° C. | 80° C. | 70° C. |
| Number of shrink sleeve label pieces with ink layer remaining (n = 10) | 0 | 0 | 0 | 0 | 0 |

TABLE 3

|  | Experiment 10 | Experiment 11 | Experiment 12 |
|---|---|---|---|
| Temperature of preheating (hot water temperature) | 80° C. | 80° C. | 90° C. |
| Temperature of alkaline desorption (NaOH aqueous solution temperature) | 90° C. | 95° C. | 95° C. |
| Number of shrink sleeve label pieces with ink layer remaining (n = 10) | 8 | 5 | 4 |

In Tables 1 to 3, Experiments 1 to 9 are examples, and Experiments 10 to 12 are comparative examples. As is clear from comparison between Experiments 1 to 9 and Experiments 10 to 12, in Experiments 1 to 9 in which the shrink sleeve label was preheated, subsequently shredded to form the shrink sleeve label pieces, and then subjected to alkaline desorption in a NaOH aqueous solution at a temperature lower than the temperature of the hot water used for preheating to release the ink layer from the shrink sleeve label pieces, it was confirmed that the ink layer can be removed from a greater number of shrink sleeve label pieces compared to Experiments 10 to 12 in which alkaline desorption was performed in a NaOH aqueous solution at a temperature higher than the temperature of the hot water used for preheating.

Further, as is clear from comparison between Experiments 1 to 4 and Experiments 5 to 9, in Experiments 5 to 9 in which alkaline desorption was performed in a NaOH aqueous solution at a temperature lower than the temperature of the preheating, it was confirmed that the ink layer can be removed from a greater number of shrink sleeve label pieces compared to Experiments 1 to 4 in which alkaline desorption was performed in a NaOH aqueous solution at the same temperature as the temperature of the hot water used for preheating.

Further, in Experiments 1 to 8, which are examples, the time from immersion of the shrink sleeve label pieces in the NaOH aqueous solution to removal of the ink layer from the shrink sleeve label pieces was about 60 seconds, and thus it was confirmed that the ink layer can be more efficiently removed than in Patent Document 1, which requires immersion for 5 to 30 minutes. Further, in Experiment 9, which is an example, the amount of ink coating film remaining in the NaOH aqueous solution was extremely small, and thus it was confirmed that the NaOH aqueous solution can easily be reused.

While the present disclosure has been described in embodiments and examples, combining the configurations in the embodiments and examples described above as appropriate is also originally intended.

It should be understood that the embodiments disclosed herein are illustrative and non-restrictive in any respect. The scope of the present disclosure is defined by the terms of the claims, rather than the description above, and is intended to include any modifications within the scope and meaning equivalent to the terms of the claims.

REFERENCE SIGNS LIST

10 PET bottle
11 Shrink sleeve label
12 Collection box
20 Bale with shrink sleeve labels
30 Recycling plant
40 Regular label
60 Hot water 61 Hot air tunnel
62 Hot water tank
70 Shredder
71 Shrink sleeve label piece
80 Aqueous alkaline solution
82 Thermal alkaline tank
90 First mesh
91 Shrink film piece
92 Second mesh
93 Ink coating film

The invention claimed is:

1. A method of removing an ink layer from a shrink sleeve label, the method comprising:
preheating the shrink sleeve label including the ink layer;
shredding the shrink sleeve label after the preheating to fabricate shrink sleeve label pieces; and
removing the ink layer from the shrink sleeve label pieces by alkaline desorption,
wherein a temperature of the preheating is the same as a temperature of the alkaline desorption or higher than the temperature of the alkaline desorption.

2. The method of removing an ink layer from a shrink sleeve label according to claim 1, wherein the temperature of the alkaline desorption is 65° C. or higher.

3. The method of removing an ink layer from a shrink sleeve label according to claim 1, wherein the preheating includes immersing the shrink sleeve label in hot water.

4. The method of removing an ink layer from a shrink sleeve label according to claim 1, wherein the temperature of the preheating is at least 5° C. higher than the temperature of the alkaline desorption.

\* \* \* \* \*